United States Patent [19]

Yamada et al.

[11] Patent Number: 5,949,957
[45] Date of Patent: *Sep. 7, 1999

[54] VIDEO CAMERA HAVING STORAGE MEDIUM-EQUIPPED RECORDER-REPRODUCER AND CONTROL METHOD THEREOF

[75] Inventors: Akane Yamada; Hajime Watanabe, both of Tokyo; Hiroyuki Sato, Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/805,071

[22] Filed: Feb. 25, 1997

[30] Foreign Application Priority Data

Mar. 5, 1996 [JP] Japan .................................. 8-047017

[51] Int. Cl.$^6$ .................................................. H04N 5/225
[52] U.S. Cl. ........................................... 386/117; 386/119
[58] Field of Search ............................. 386/38, 117, 118, 386/119, 120; 358/906, 909.1; 348/222, 231, 584, 588, 333, 598; H04N 5/225

[56] References Cited

U.S. PATENT DOCUMENTS 5,097,348   3/1992   Suetaka .................................... 386/118
5,162,915  11/1992   Idera et al. .............................. 358/224
5,191,434   3/1993   Kim ......................................... 386/84
5,483,285   1/1996   Lim et al. ............................... 348/341
5,502,487   3/1996   Choi ..................................... 358/909.1
5,535,011   7/1996   Yamagami et al. ................... 358/909.1

FOREIGN PATENT DOCUMENTS 0 637 169 A2   2/1995   European Pat. Off. .

*Primary Examiner*—Wendy Garber
*Assistant Examiner*—Luong Nguyen
*Attorney, Agent, or Firm*—Frommer Lawrence & Haug, LLP.; William S. Frommer; Dennis M. Smid

[57] ABSTRACT

A video camera having a recorder-reproducer, comprising an OSD IC and an LCD panel device that includes a synchronization signal separation circuit, an LCD panel, a signal line, and an LCD controller made of a horizontal synchronization separation circuit and a PLL circuit. The horizontal synchronization separation circuit separates a horizontal synchronizing signal from a composite synchronizing signal received from the synchronizing signal separation circuit. The PLL circuit generates a reproduced horizontal synchronizing signal in synchronism with the horizontal synchronizing signal separated by the horizontal synchronization separation circuit. The reproduced horizontal synchronizing signal output by the PLL circuit is fed to the LCD panel via the signal line. Although the PLL circuit is intended to supply the reproduced horizontal synchronizing signal primarily to the LCD panel, this signal is also fed to the OSD IC via a terminal and a switch.

14 Claims, 6 Drawing Sheets

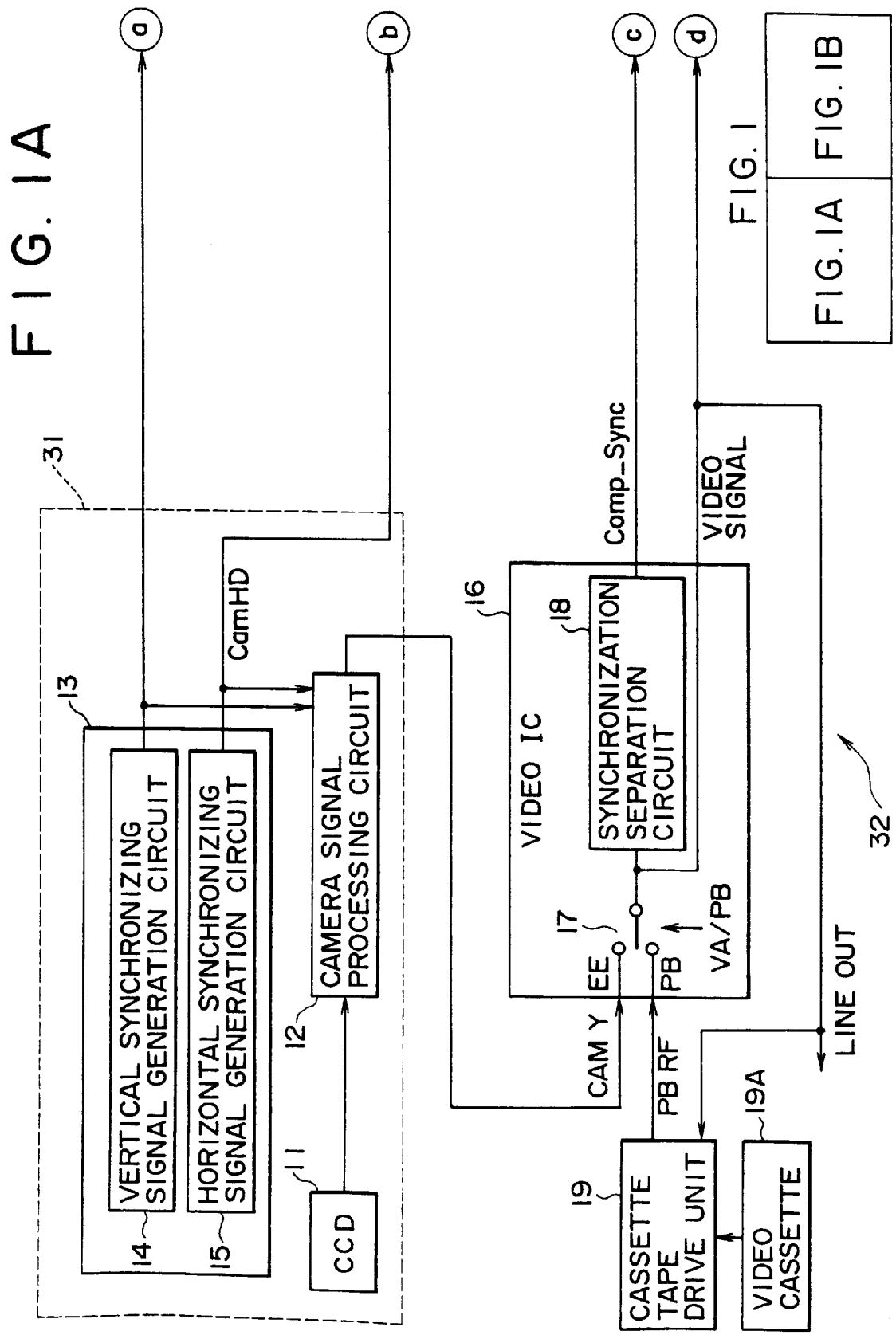

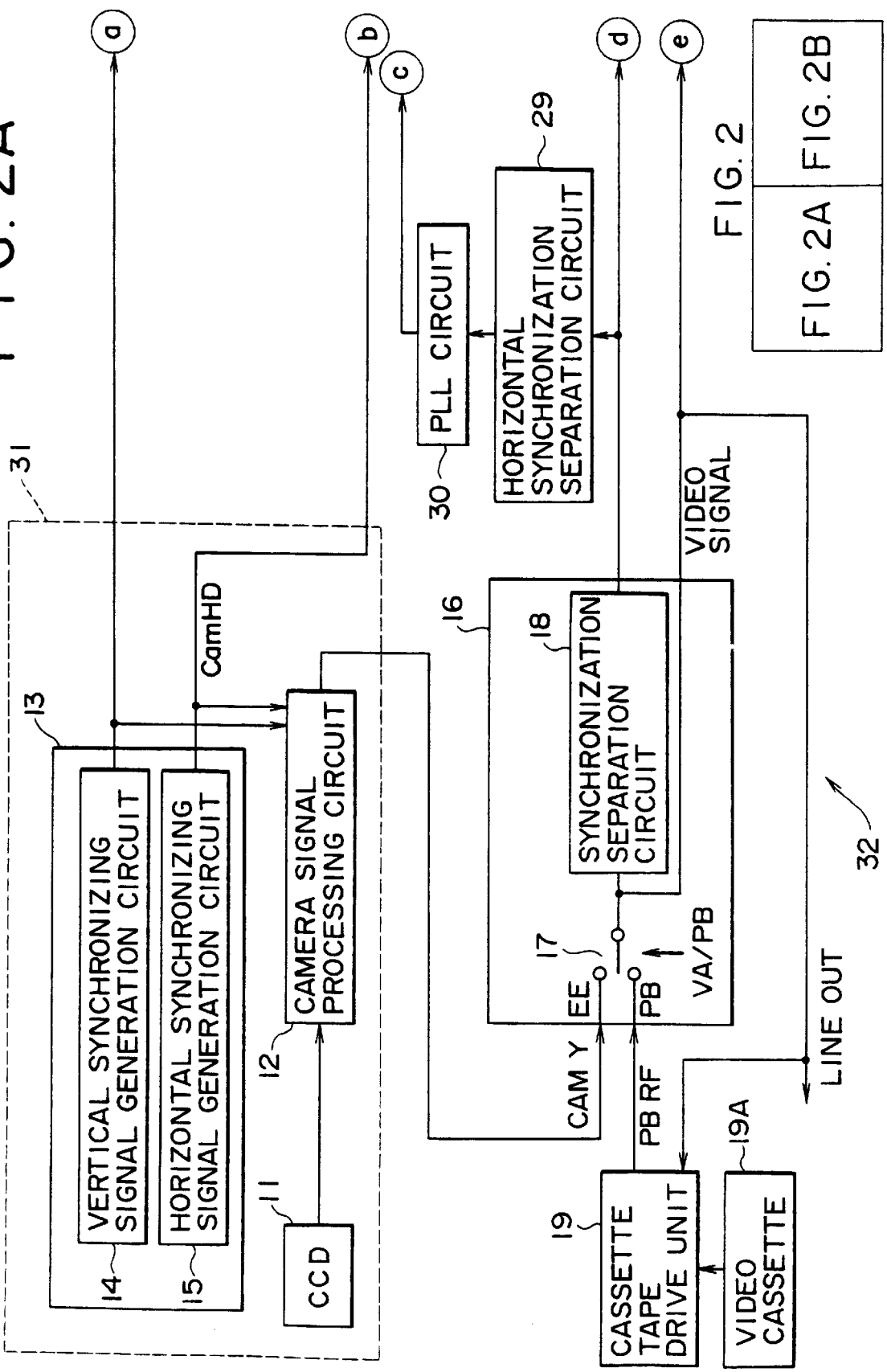

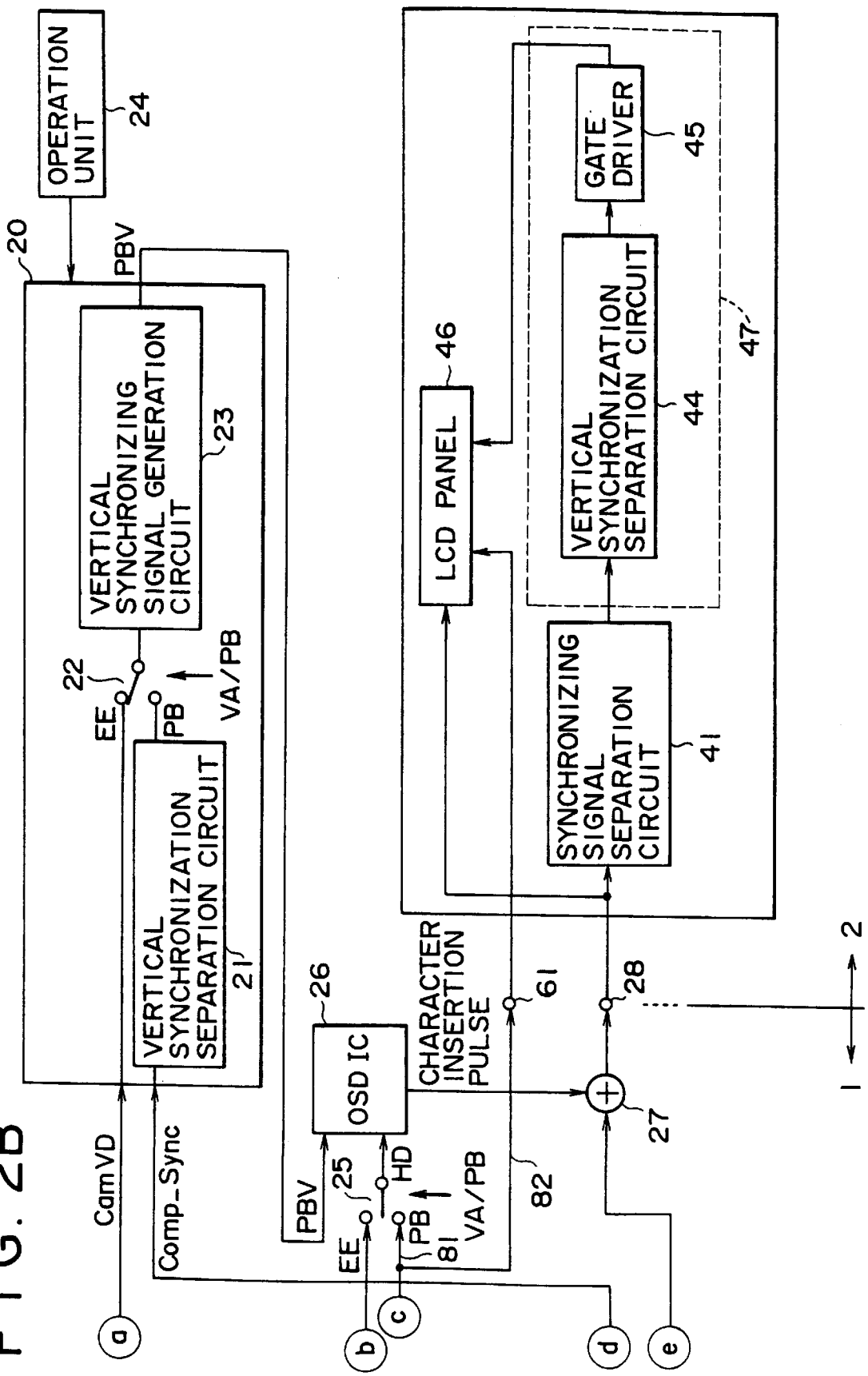

VIDEO CAMERA HAVING STORAGE MEDIUM-EQUIPPED RECORDER-REPRODUCER AND CONTROL METHOD THEREOF

BACKGROUND OF THE INVENTION

1. Field of the Invention

The present invention relates to a video camera having a storage medium-equipped recorder-reproducer and a control method for controlling the camera. More particularly, the invention relates to a video camera having a storage medium-equipped recorder-reproducer and a control method thereof, the camera having fewer components costing less than comparable conventional models.

2. Description of the Related Art

FIG. 3 is a block diagram of a conventional portable video camera having a video cassette recorder. The video cassette recorder-equipped video camera of FIG. 3 is constituted primarily by a video camera 31 and a video cassette recorder 32. The video camera 31 includes a CCD 11 for picking up images of objects, and a camera signal processing circuit 12 for processing the output of the CCD 11 and outputting a video signal illustratively in the NTSC format. The video camera 31 comprises a synchronizing signal generation circuit 13 made up of a vertical synchronizing signal generation circuit 14 and a horizontal synchronizing signal generation circuit 15. A vertical synchronizing signal (signal CAM VD) and a horizontal synchronizing signal (signal CAM HD) generated respectively by the vertical and horizontal synchronizing signal generation circuits 14 and 15 are supplied to the camera signal processing circuit 12.

The video cassette recorder 32 comprises a cassette tape drive unit 19 that records on a video cassette 19A the video signal coming from the video camera 31 and reproduces the video signal from the video cassette 19A. The video signal (PB RF) reproduced and output by the cassette tape drive unit 19 is fed to a synchronization separation circuit 18 via a contact PB of a switch 17 in a video IC 16. Via another contact EE of the switch 17, the synchronization separation circuit 18 receives the video signal (CAM Y) output by the camera signal processing circuit 12.

The switch 17 is designed to select a video signal either through the contact PB (signal PB RF) or the contact EE (signal CAM Y) and to output the selected signal as a line-out signal to the cassette tape drive unit 19 and an external device. The line-out signal is also supplied to an LCD panel device 2 via an adder 27 and a terminal 28.

The synchronization separation circuit 18 separates a composite synchronizing signal from the video signal received via the switch 17, and forwards the separated composite signal to a horizontal synchronization separation circuit 29 and a vertical synchronization separation circuit 21. The horizontal synchronization separation circuit 29 separates a horizontal synchronizing signal from the received composite synchronizing signal and feeds the separated signal to a PLL circuit (AFC circuit) 30. The PLL circuit 30 generates a reproduced horizontal synchronizing signal in synchronism with the received horizontal synchronizing signal, and outputs the signal thus generated to an OSD IC 26 via the contact PB of the switch 25.

The vertical synchronization separation circuit 21 in a mechanism control microcomputer 20 separates a vertical horizontal synchronizing signal from the received composite synchronizing signal and supplies the separated signal to a horizontal synchronizing signal generation circuit 23 via a contact PB of a switch 22. In addition, the vertical synchronizing signal generation circuit 23 receives via a contact EE of the switch 22 the vertical synchronizing signal output by the vertical synchronizing signal generation circuit 14. The vertical synchronizing signal (signal PBV) generation circuit 23 generates a reproduced vertical synchronizing signal in synchronism with the vertical synchronizing signal received through the switch 22, and forwards the generated signal to the OSD IC 26.

The OSD IC 26 generates pulses representing characters and figures to be inserted onto a screen in synchronism with the reproduced horizontal and vertical synchronizing signals received above (the pulses are called on-screen display (OSD) pulses). The generated pulses are sent to the adder 27.

The adder 27 overlays the video signal from the video IC 16 with the OSD pulses from the OSD IC 26. The result of the overlay operation is output to the LCD panel device 2 via the terminal 28.

An operation unit 24 is operated by a user wishing to manipulate the video camera 31 or video cassette recorder 32 as desired. Signals representing the desired operations are output to the mechanism control microcomputer 20.

The above-described circuits and components are all incorporated in a camcorder enclosure 1.

The LCD panel device 2 is attached as a single component to the camcorder enclosure 1. The LCD panel device 2 accommodates an LCD panel 46 that displays the video signal received through the terminal 28. A synchronizing signal separation circuit 41 in the LCD panel device 2 separates the composite synchronizing signal from the video signal received via the terminal 28, and sends the separated signal to a horizontal synchronization separation circuit 42 and a vertical synchronization separation circuit 44 in an LCD controller 47. The horizontal synchronization separation circuit 42 separates a horizontal synchronizing signal from the received composite synchronizing signal, and outputs the separated signal to a PLL circuit (AFC circuit) 43. The PLL circuit 43 generates a reproduced horizontal synchronizing signal in synchronism with the horizontal synchronizing signal received from the horizontal synchronization separation circuit 42, and forwards the generated signal to the LCD panel 46. The vertical synchronization separation circuit 44 separates a vertical synchronization signal from the received composite synchronizing signal, and sends the separated signal to a gate driver 45. The gate driver 45 generates gate driver start pulses in phase with the received vertical synchronizing signal, and outputs the generated pulses to the LCD panel 46.

In the example above, the user first operates the operation unit 24 to order the mechanism control microcomputer 20 to make the video camera 31 pick up images. In turn, a video signal representing an object picked up by the CCD 11 of the video camera 31 is fed to the LCD panel 46 for display. Characters and symbols denoting the operations performed on the operation unit 24 are generated by the OSD IC 26 and overlaid onto the video signal by the adder 27. The overlay operation allows the LCD panel 46 to display the characters and figures generated by the OSD IC 26.

The operation unit 24 may be operated to establish a recording mode. In this mode, part of the video signal fed to the LCD panel 46 is forwarded to the cassette tape drive unit 19 and recorded onto the video cassette 19A.

When the operation unit 24 is operated to order signal reproduction from the video cassette 19A, a reproduced signal from the cassette tape drive unit 19 is output to the LCD panel 46 for display. At this point, too, OSD signals generated by the OSD IC 26 are suitably output to and displayed on the LCD panel 46.

Where recordings of the video cassette 19A are reproduced in the above example, the horizontal synchronization separation circuit 29 and PLL circuit 30 generate and output a reproduced horizontal synchronizing signal needed to generate the OSD signals. The horizontal synchronization separation circuit 42 and PLL circuit 43 in the LCD controller 47 generate a reproduced horizontal synchronizing signal necessary for displaying the video signal on the LCD panel 46.

As outlined above, the conventional video cassette recorder-equipped video camera comprises two sets of horizontal synchronization separation circuit and PLL circuit: the horizontal synchronization separation circuit 29 and PLL circuit 30 for generating a reproduced horizontal synchronizing signal fed to the OSD IC 26 on the one hand, and the horizontal synchronization separation circuit 42 and PLL circuit 43 in the LCD controller 47 for generating a reproduced horizontal synchronizing signal supplied to the LCD panel 46 on the other hand. An obvious disadvantage of such a redundant circuit constitution is an increased number of components resulting in higher costs.

SUMMARY OF THE INVENTION

It is therefore an object of the present invention to overcome the above and other disadvantages of the related art and to provide a video camera having a storage medium-equipped recorder-reproducer incorporating fewer components costing less than comparable conventional models.

In carrying out the invention and according to one aspect thereof, there is provided a video camera having a recorder-reproducer, comprising: a video camera unit for picking up images of objects; a recorder-reproducer for recording a video signal from the video camera unit onto a recording medium and for reproducing the video signal from the storage medium; display means for displaying the video signal coming either from the video camera unit or from the storage medium; OSD signal generation means for generating OSD signals for display on the display means; overlay means for overlaying the OSD signals from the OSD signal generation means onto the video signal coming either from the video camera unit or from the storage medium; generation means for generating a reproduced horizontal synchronizing signal in synchronism with a horizontal synchronizing signal included in the video signal coming either from the video camera unit or from the storage medium; first supply means for supplying the reproduced horizontal synchronizing signal to the display means; and second supply means for supplying the reproduced horizontal synchronizing signal to the OSD signal generation means.

According to another aspect of the invention, there is provided a control method for controlling the above video camera having the recorder-reproducer, whereby the reproduced horizontal synchronizing signal is fed both to the display means and to the OSD signal generation means.

As an advantage of the inventive video camera having the recorder-reproducer and the control method thereof, the reproduced horizontal synchronizing signal generated by the generation means is supplied not only to the display means but also to the OSD signal generation means.

These and other objects, features and advantages of the invention will become more apparent upon a reading of the following description and appended drawings.

BRIEF DESCRIPTION OF THE DRAWINGS

FIG. 2 is a block diagram of a video camera having a video cassette recorder practiced as an application of another video camera having a storage medium-equipped recorder-reproducer embodying the invention.

DESCRIPTION OF THE PREFERRED EMBODIMENTS

Figure 1B:
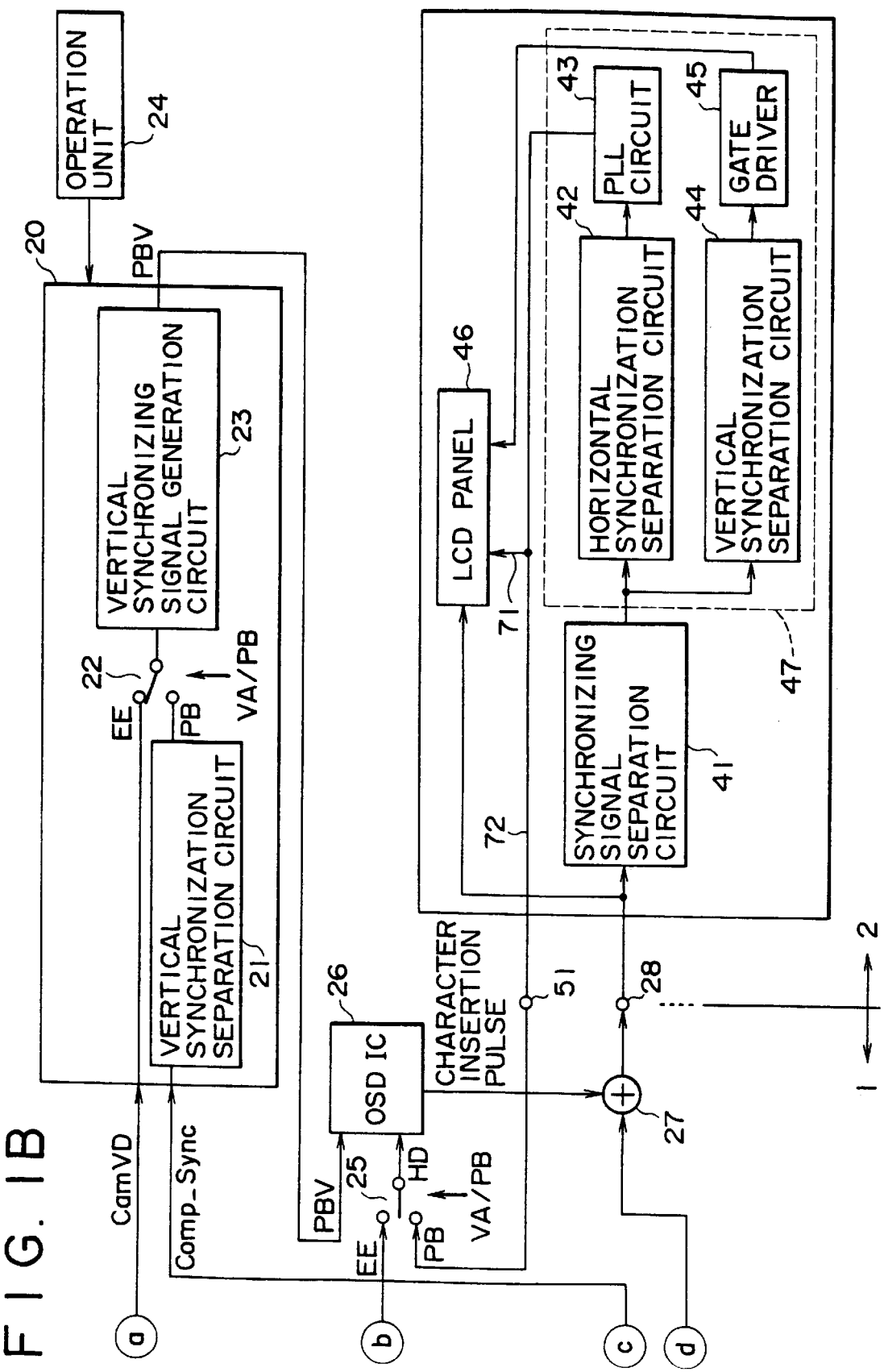
FIG. 1 is a block diagram of a video camera having a video cassette recorder practiced as an application of a video camera having a storage medium-equipped recorder-reproducer embodying the invention.
Figure 3A:
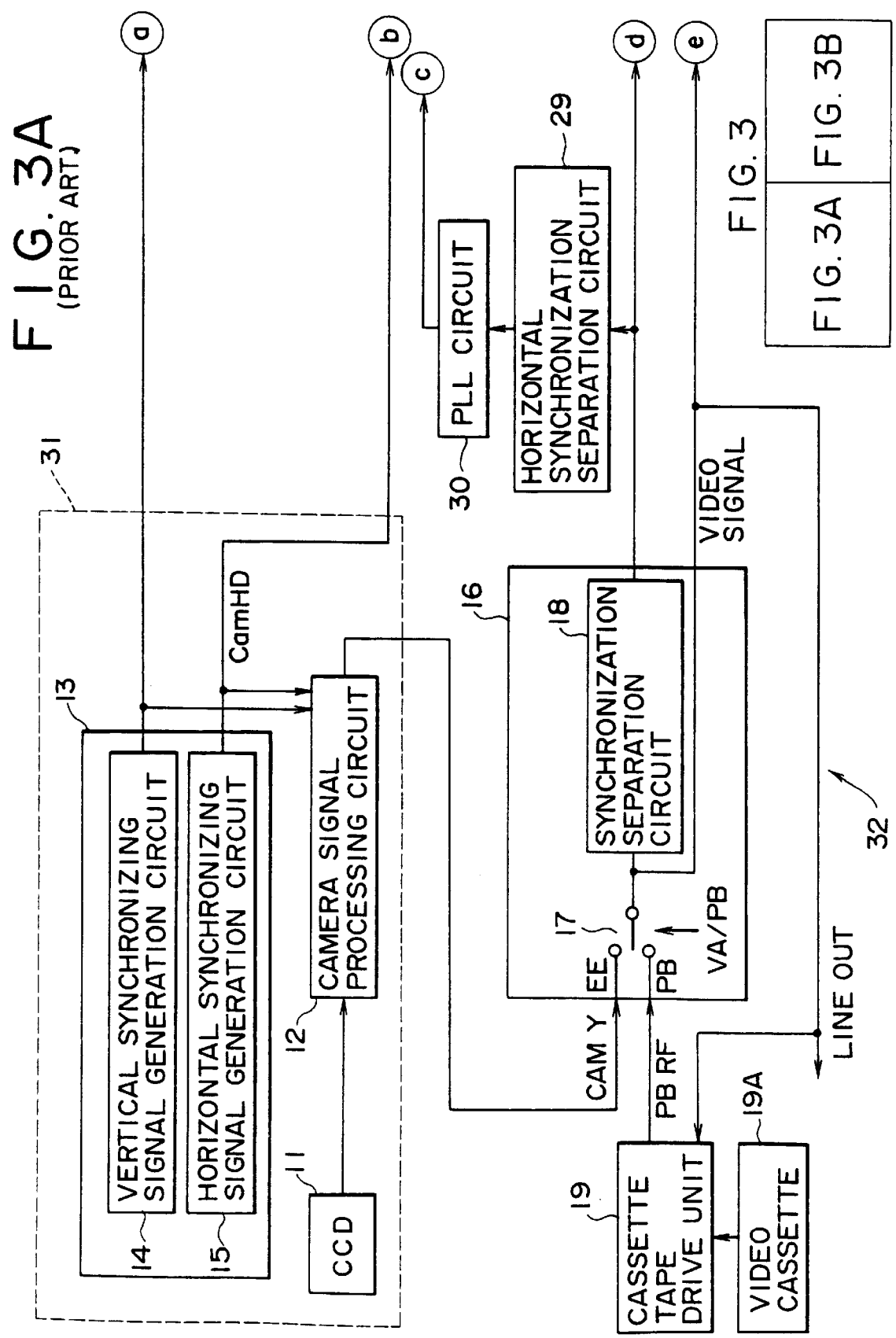
FIG. 3 is a block diagram of a conventional video camera having a video cassette recorder.
Figure 3B:
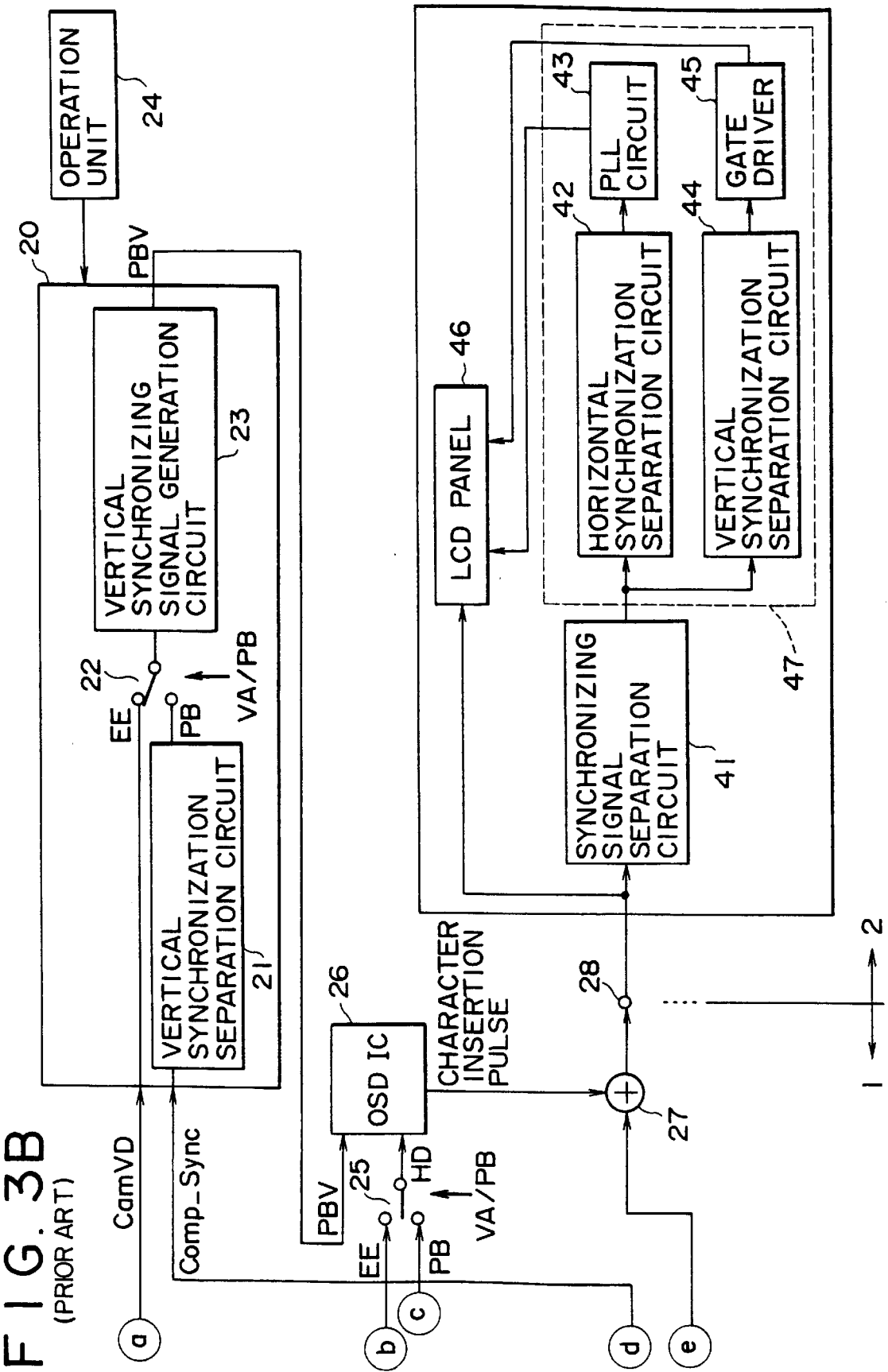

FIG. 1 shows a typical constitution of a video camera having a video cassette recorder practiced as an application of a video camera having a storage medium-equipped recorder-reproducer embodying the invention. The video cassette recorder-equipped video camera is basically the same in structure as the conventional video camera shown in FIG. 3. One difference is that the video camera of FIG. 1 omits the horizontal synchronization separation circuit 29 and PLL circuit 30 included in FIG. 3. Another difference is that in the video camera of FIG. 1, the reproduced horizontal synchronizing signal output by the PLL circuit 43 (generation means) in the LCD controller 47 is supplied both to the LCD panel 46 (display means) via a line 71 (first supply means) and to the contact PB of the switch 25 via a line 72 and a terminal 51 (second supply means). The other components of the embodiment in FIG. 1 are substantially the same as those of the conventional setup in FIG. 3, and their descriptions are thus omitted where they are repetitive.

The embodiment of FIG. 1 works as follows: a user first operates the operation unit 24 to order the video camera 31 to pick up images of a desired object. In response, the mechanism control microcomputer 20 outputs a VA/PB signal to position the switches 17, 22 and 25 to the contact EE each.

At this point, a signal representing the object picked up by the CCD 11 is input to the camera signal processing circuit 12. The camera signal processing circuit 12 processes the signal from the CCD 11 in synchronism with the vertical and horizontal synchronizing signals from the vertical and horizontal synchronizing signal generation circuits 14 and 15, and generates a video signal in the NTSC format. The video signal thus generated is output to the video IC 16.

The video IC 16 admits via the contact EE of the switch 17 the video signal coming from the camera signal processing circuit 12. The video signal is forwarded via the adder 27 and terminal 28 to the LCD panel 46 of the LCD panel device 2. At this point, the synchronizing signal separation circuit 41 separates a composite synchronizing signal from the video signal received through the terminal 28, and outputs the separated signal. The horizontal synchronization separation circuit 42 separates a horizontal synchronizing signal from the composite synchronizing signal output by the synchronizing signal separation circuit 41, and outputs the separated signal to the PLL circuit 43. The PLL circuit 43 generates a reproduced horizontal synchronizing signal in synchronism with the horizontal synchronizing signal received from the horizontal synchronization separation circuit 42. The reproduced horizontal synchronizing signal is output via the line 71 to the LCD panel 46.

Likewise, the vertical separation circuit 44 separates a vertical synchronizing signal from the composite synchronizing signal received from the synchronizing signal separation circuit 41. The signal thus separated is sent to the gate driver 45. The gate driver 45 generates gate driver start pulses in synchronism with the received vertical synchronizing signal, and outputs the generated pulses to the LCD panel 46. The LCD panel 46 displays the input video signal in synchronism with the gate driver start pulses from the gate driver 45 and with the reproduced horizontal synchronizing signal from the PLL circuit 43. This allows the user to monitor on the LCD panel 46 images of the object picked up by the video camera 31.

If the operation unit 24 is operated to order recording, the video signal admitted through the switch 17 of the video IC 16 is supplied to the cassette tape drive unit 19. The video signal is then recorded onto the video cassette 19A.

In a camera mode in which the video camera 31 is operated, the mechanism control microcomputer 20 controls the OSD IC 26 (OSD signal generation means) to generate various OSD signals.

In the above case, the switch 22 in the mechanism control microcomputer 20 supplies via its contact EE the vertical synchronizing signal generation circuit 23 with the vertical synchronizing signal from the vertical synchronizing signal generation circuit 14 in the video camera 31. The vertical synchronizing signal generation circuit 23 generates a reproduced vertical synchronizing signal in synchronism with the received vertical synchronizing signal. The reproduced vertical synchronizing signal thus generated is fed to the OSD IC 26.

The OSD IC 26 is supplied through the contact EE of the switch 25 with the horizontal synchronizing signal generated by the horizontal synchronizing signal generation circuit 15 of the video camera 31. The OSD IC 26 generates OSD signals in synchronism with the reproduced vertical synchronizing signal from the vertical synchronizing signal generation circuit 23 and with the horizontal synchronizing signal from the horizontal synchronizing signal generation circuit 15. The generated OSD signals are fed to the adder 27 to be overlaid thereby onto the video signal. This allows the LCD panel 46 to display appropriate messages (in characters) and symbols necessary for the ongoing operations.

If the operation unit 24 is operated to order signal reproduction from the video cassette 19A, the mechanism control microcomputer 20 establishes a video mode and positions the switches 17, 22 and 25 to the contact PB each. When the operation unit 24 is operated to designate the start of signal reproduction, the cassette tape drive unit 19 starts signal reproduction of the video cassette 19A and feeds a reproduced video signal to the video IC 16. The video IC 16 receives the reproduced video signal through the contact PB of the switch 17. The reproduced video signal thus received is forwarded to the LCD panel 46 via the adder 27 and terminal 28. At this point, as in the camera mode, the PLL circuit 43 and gate driver 45 in the LC controller 47 generate a reproduced horizontal synchronizing signal and gate driver start pulses respectively and feed them to the LCD panel 46. The LCD panel 46 displays the video signal received via the terminal 28 in synchronism with the reproduced horizontal synchronizing signal and gate driver start pulses.

The reproduced horizontal synchronizing signal generated by the PLL circuit 43 is supplied not only to the LCD panel 46 via the line 71 but also to the OSD IC 26 through the line 72, terminal 51, and contact PB of the switch 25.

The synchronization separation circuit 18 separates a composite synchronizing signal from the video signal received via the switch 17 in the video IC 16. The composite synchronizing signal thus separated is sent to the vertical synchronization separation circuit 21 in the mechanism control microcomputer 20. The vertical synchronization separation circuit 21 separates a vertical synchronizing signal from the received composite synchronizing signal, and feeds the separated signal to the vertical synchronizing signal generation circuit 23 via the contact PB of the switch 22. The vertical synchronizing signal generation circuit 23 generates a reproduced vertical synchronizing signal in synchronism with the vertical synchronizing signal received from the vertical synchronization separation circuit 21. The reproduced vertical synchronizing signal thus generated is output to the OSD IC 26.

In the reproduction mode (i.e., video mode) for signal reproduction of the video cassette 19A, as described, the reproduced vertical and horizontal synchronizing signals are generated in synchronism with the vertical and horizontal synchronizing signals included in the reproduced video signal derived from the video cassette 19A. The reproduced vertical and horizontal synchronizing signals thus generated are supplied to the OSD IC 26.

In synchronism with the reproduced vertical and horizontal synchronizing signals thus received, the OSD IC 26 generates OSD signals representing various messages (in characters) and symbols necessary for the operations of the operation unit 24. The OSD signals are generated and output to the adder 27 (overlay means) to be overlaid thereby onto the video signal. This allows the LCD panel 46 to display appropriate messages and symbols.

In the above embodiment, as described, the OSD IC 26 is fed with the reproduced horizontal synchronizing signal generated by the horizontal synchronization separation circuit 42 and PLL circuit 43 in the LCD controller 47. This arrangement renders the horizontal synchronization separation circuit 29 and PLL circuit 30 in FIG. 3 redundant. With the fewer components to be incorporated, the embodiment costs less to manufacture.

FIG. 2 depicts a video camera having a video cassette recorder practiced as an application of another video camera having a storage medium-equipped recorder-reproducer embodying the invention. The embodiment of FIG. 2 is characterized by the absence of the horizontal synchronization separation circuit 42 and PLL circuit 43 included in the LCD controller 47 of FIG. 1. Instead, as with the conventional model of FIG. 3, the embodiment of FIG. 2 has the horizontal synchronization separation circuit 29 and PLL circuit 30 installed in the camcorder enclosure 1. The output of the PLL circuit 30 is fed both to the contact PB of the switch 25 and to the LCD panel 46 via a terminal 61. The other components of the embodiment in FIG. 2 are substantially the same as those of the embodiment in FIG. 1.

In the embodiment of FIG. 2, the horizontal synchronization separation circuit 29 separates a horizontal synchronizing signal from the composite synchronizing signal output by the synchronization separation circuit 18, and outputs the separated signal to the PLL circuit 30. The PLL circuit 30 generates a reproduced horizontal synchronizing signal in synchronism with the horizontal synchronizing signal received from the horizontal synchronization separation circuit 29. The reproduced horizontal synchronizing signal thus generated is supplied to the terminal 61 via a line 82 and from the terminal 61 on to the LCD panel 46. Thus the LCD panel 46 is supplied, in each of two different states, with the reproduced horizontal synchronizing signal synchronized with the horizontal synchronizing signal included in the video signal received via the switch 17 of the video IC 16. That is, the reproduced horizontal synchronizing signal is provided both when the video camera 31 is operated and when the video signal is reproduced from the video cassette 19A in the reproduction mode.

The reproduced horizontal synchronizing signal generated by the PLL circuit 30 is supplied to the contact PB of the switch 25 via a line 81. This means that in the reproduction mode for signal reproduction from the video cassette 19A, the reproduced horizontal synchronizing signal is sent to the OSD IC 26 through the switch 25.

The other operations of the embodiment in FIG. 2 are the same as those of the embodiment in FIG. 1, and their descriptions are therefore omitted.

In the embodiment of FIG. 2, as described, the horizontal synchronization separation circuit 29 and PLL circuit 30 are provided in the camcorder enclosure 1 while the horizontal synchronization separation circuit 42 and PLL circuit 43 are omitted from the LCD controller 47. Thus with the reduced number of components to make up its constitution, the embodiment of FIG. 2 also costs less to manufacture.

The embodiments above have been described primarily as applications of the video cassette recorder-equipped video camera for recording the video signal onto the video cassette. However, such applications are not limitative of the invention. The invention may also be applied where the video signal is recorded on any other suitable storage medium.

As described and according to the inventive video camera having the recorder-reproducer as well as to the control method thereof, the reproduced horizontal synchronizing signal generated by the generation means is supplied not only to the display means but also to the OSD signal generation means. The invention thus embodied reduces the number of the components involved and lowers the manufacturing costs of the resulting video camera.

While preferred embodiments of the invention have been described using specific terms, such description is for illustrative purposes only, and it is to be understood that changes and variations may be made without departing from the spirit or scope of the following claims.

What is claimed is:

1. A video camera having a recorder-reproducer, comprising:
   a video camera unit for picking up images of objects;
   a recorder-reproducer for recording a video signal from said video camera unit onto a recording medium and for reproducing said video signal from a storage medium;
   display means including a single LCD panel for displaying said video signal coming either from said video camera unit or from said storage medium;
   OSD signal generation means for generating OSD signals for display on said display means;
   overlay means for overlaying said OSD signals from said OSD signal generation means onto said video signal coming either from said video camera unit or from said storage medium so as to generate an overlay signal;
   generation means including a single horizontal synchronization separation circuit and a single phase lock loop circuit for generating a reproduced horizontal synchronizing signal in synchronism with a horizontal synchronizing signal included in said video signal coming either from said video camera unit or from said storage medium;
   first supply means for supplying said reproduced horizontal synchronizing signal to said display means; and
   second supply means for supplying said reproduced horizontal synchronizing signal to said OSD signal generation means;
   wherein said OSD signal generation means and said display means receive said reproduced horizontal synchronizing signal generated by use of the single horizontal synchronization separation circuit and the single phase lock loop circuit; and
   wherein said reproduced horizontal synchronizing signal and said overlay signal are supplied to said single LCD panel of said display means.

2. A video camera having a recorder-reproducer according to claim 1, further comprising:
   first accommodation means for accommodating said display means and said generation means; and
   second accommodation means for accommodating said OSD signal generation means and said overlay means;
   wherein said second supply means sends said reproduced horizontal synchronizing signal from said first accommodation means to said second accommodation means.

3. A video camera having a recorder-reproducer according to claim 1, further comprising:
   first accommodation means for accommodating said display means; and
   second accommodation means for accommodating said OSD signal generation means, said overlay means and said generation means;
   wherein said first supply means sends said reproduced horizontal synchronizing signal from said second accommodation means to said first accommodation means.

4. A control method for controlling a video camera having a storage medium equipped in a recorder-reproducer comprising:
   a video camera unit for picking up images of objects:
     a recorder-reproducer for recording a video signal from said video camera unit onto a recording medium and for reproducing said video signal from said storage medium;
     display means including a single LCD panel for displaying said video signal coming either from said video camera unit or from said storage medium;
     OSD signal generation means for generating OSD signals for display on said display means;
     overlay means for overlaying said OSD signals from said OSD signal generation means onto said video signal coming either from said video camera unit or from said storage medium so as to generate an overlay signal; and
     generation means for including a single horizontal synchronization separation circuit and a single phase lock loop circuit for generating a reproduced horizontal synchronizing signal in synchronism with a horizontal synchronizing signal included in said video signal coming either from said video camera unit or from said storage medium;
     wherein said OSD signal generation means and said display means receive said reproduced horizontal synchronizing signal generated by use of the single horizontal synchronization separation circuit and the single phase lock loop circuit; and
     wherein said reproduced horizontal synchronizing signal and said overlay signal are supplied to said single LCD panel of said display means.

5. A video camera having a video cassette recorder, comprising:
   a video camera unit for picking up images of objects;
   a video cassette recorder for recording a video signal from said video camera unit onto a video cassette and for reproducing said video signal from said video cassette;

display means including a single LCD panel for displaying said video signal coming either from said video camera unit or from said video cassette;

OSD signal generation means for generating OSD signals for display on said display means;

overlay means for overlaying said OSD signals from said OSD signal generation means onto said video signal coming either from said video camera unit or from said video cassette so as to generate an overlay signal;

generation means including a single horizontal synchronization separation circuit and a single phase lock loop circuit for generating a reproduced horizontal synchronizing signal in synchronism with a horizontal synchronizing signal included in said video signal coming either from said video camera unit or from said video cassette;

first supply means for supplying said reproduced horizontal synchronizing signal to said display means; and second supply means for supplying said reproduced horizontal synchronizing signal to said OSD signal generation means;

wherein said OSD signal generation means and said display means receive said reproduced horizontal synchronizing signal generated by use of the single horizontal synchronization separation circuit and the single phase lock loop circuit; and wherein said reproduced horizontal synchronizing signal and said overlay signal are supplied to said single LCD panel of said display means.

6. A video camera having a video cassette recorder according to claim 5, further comprising:

first accommodation means for accommodating said display means and said generation means; and second accommodation means for accommodating said OSD signal generation means and said overlay means;

wherein said second supply means sends said reproduced horizontal synchronizing signal from said first accommodation means to said second accommodation means.

7. A video camera having a video cassette recorder according to claim 5, further comprising:

first accommodation means for accommodating said display means; and second accommodation means for accommodating said OSD signal generation means, said overlay means and said generation means;

wherein said first supply means sends said reproduced horizontal synchronizing signal from said second accommodation means to said first accommodation means.

8. A video camera having a recorder-reproducer according to claim 1, further comprising:

switching means connected in between said OSD signal generation means and either said video camera unit or said second supply means for supplying both said video signal and said reproduced horizontal synchronizing signal to said OSD signal generation means.

9. A video camera having a recorder reproducer according to claim 1, further comprising:

third supply means for alternately supplying an unmodified reproduced vertical synchronized signal to said display means.

10. A video camera having a recorder reproducer according to claim 9, further comprising:

switching means connected to said third supply means for generating starting pulses for said display means.

11. A control method for controlling a video camera having a storage medium equipped in a recorder-reproducer according to claim 4, wherein said control method causes starting pulses to be generated in synchronism with a received vertical synchronizing signal for the display means.

12. A video camera having a video cassette recorder according to claim 5, further comprising:

switching means connected in between said OSD signal generation means and either said video camera unit or said second supply means for supplying said video signal and said reproduced horizontal synchronizing signal to said OSD signal generation means.

13. A video camera having a video cassette recorder according to claim 5, further comprising:

third supply means for alternately supplying an unmodified reproduced vertical synchronized signal to said display means.

14. A video camera having a video cassette recorder according to claim 5, further comprising:

switching means connected to said third supply means for generating starting pulses for said display means.

* * * * *